(12) United States Patent
Gravelle et al.

(10) Patent No.: US 8,279,048 B2
(45) Date of Patent: Oct. 2, 2012

(54) RFID TAG WITH PIEZOELECTRIC SENSOR FOR POWER AND INPUT DATA

(75) Inventors: Kelly Gravelle, Poway, CA (US); Charles A. Johnson, Albuquerque, NM (US); Dale L. Scott, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 368 days.

(21) Appl. No.: 12/569,087

(22) Filed: Sep. 29, 2009

(65) Prior Publication Data

US 2010/0079238 A1 Apr. 1, 2010

Related U.S. Application Data

(60) Provisional application No. 61/101,118, filed on Sep. 29, 2008.

(51) Int. Cl.
*H04Q 5/22* (2006.01)

(52) U.S. Cl. .................................. 340/10.42

(58) Field of Classification Search ............... 340/545.1, 340/572.1, 10.42
See application file for complete search history.

(56) References Cited

U.S. PATENT DOCUMENTS

| | | | |
|---|---|---|---|
| 5,218,509 A * | 6/1993 | Fowler | 361/155 |
| 5,457,447 A * | 10/1995 | Ghaem et al. | 340/10.42 |
| 6,878,121 B2 * | 4/2005 | Krausman et al. | 600/587 |
| 7,358,856 B2 * | 4/2008 | Rajapakse et al. | 340/572.1 |
| 7,595,727 B2 * | 9/2009 | Grijalva et al. | 340/545.1 |
| 7,623,036 B2 * | 11/2009 | Onderko et al. | 340/572.1 |
| 2007/0285244 A1 * | 12/2007 | Tucker et al. | 340/572.1 |

* cited by examiner

*Primary Examiner* — Jennifer Mehmood
*Assistant Examiner* — Kaleria Knox
(74) *Attorney, Agent, or Firm* — Caesar, Rivise, Bernstein, Cohen & Pokotilow, Ltd.

(57) ABSTRACT

An RFID tag having a non-volatile memory and a piezoelectric sensor. The piezoelectric sensor produces an electrical charge that momentarily supplies electrical power to the RFID tag when subjected to a mechanical force and the electrical power is sufficient to record data in the non-volatile memory. The piezoelectric sensor is affixed to an article such that an attempt to tamper with the article produces sufficient mechanical force on the piezoelectric sensor to record data evidencing the tampering in the non-volatile memory.

12 Claims, 1 Drawing Sheet

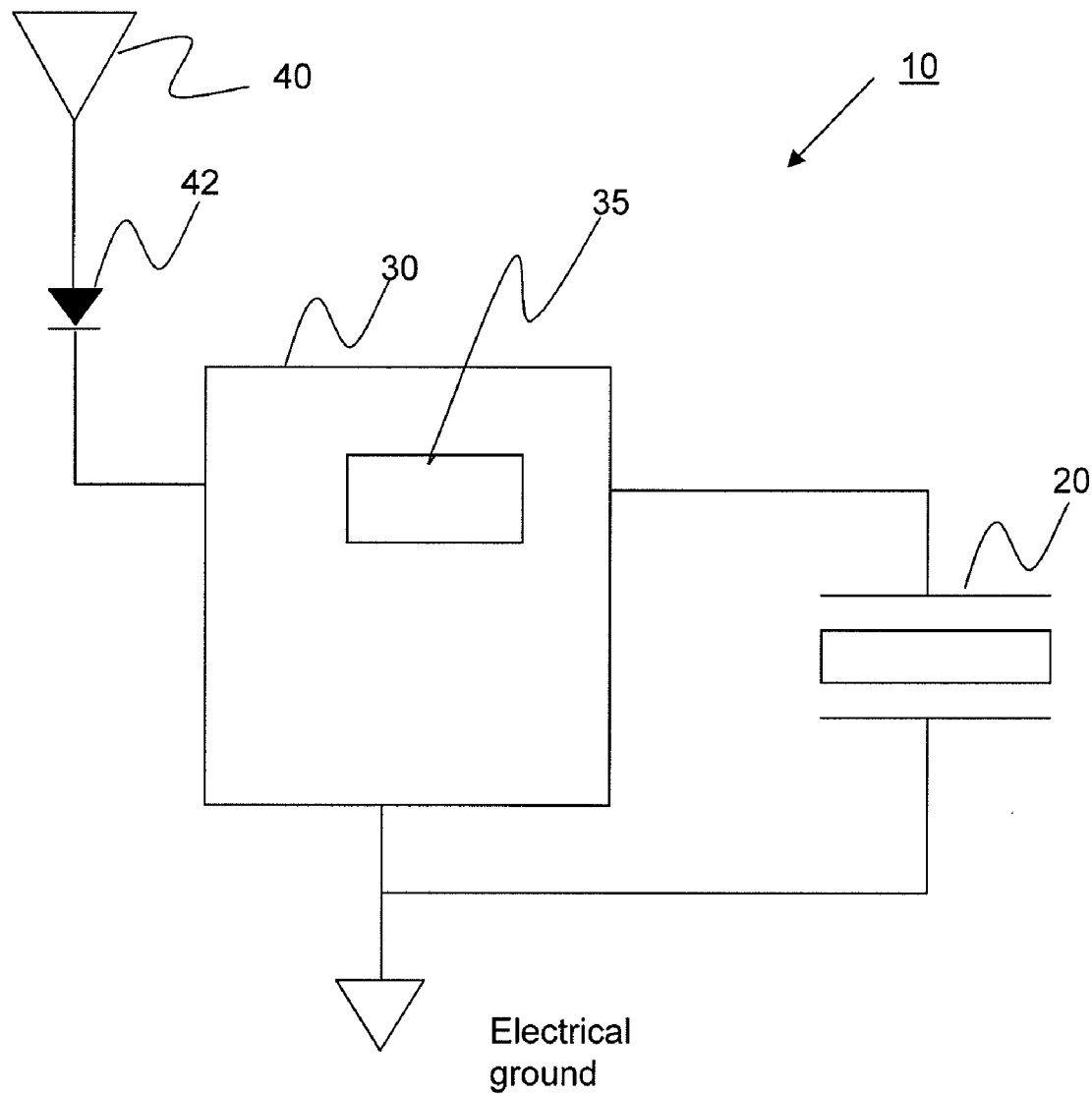

RFID TAG WITH PIEZOELECTRIC SENSOR FOR POWER AND INPUT DATA

CROSS-REFERENCE TO RELATED APPLICATIONS

This application claims priority to, and the benefit of U.S. Provisional Application No. 61/101,118, filed Sep. 29, 2008 for all matter common to both applications. The disclosure of said provisional application is hereby incorporated by reference in its entirety.

SPECIFICATION

Field of the Invention

This invention relates generally to RFID tags and more particularly for RFID tags without battery power and having non-volatile memory to which data can be written when the tag is not being powered by an electromagnetic signal from a tag reader.

BACKGROUND OF THE INVENTION

Radio Frequency Identification devices ("RFID tags") are known in the art and used for many purposes, including article control in retail stores and warehouses, electronic toll collection and tracking of freight containers. In many cases, the RFID tag is powered only by the electromagnetic energy from the radio signal sent by an interrogation device or "tag reader." Thus, when the tag is not being read, it is not possible for the tag electronics to perform any functions unless the tag is also battery powered. Battery power is not an option in many cases for reasons such as cost, size and reliability.

It is known in the art to provide RFID tags with non-volatile memory for storage of information that the user or the tag issuing entity may need to change during the tag's lifetime. Changing or writing data to the non-volatile memory such as an EEPROM requires that the tag be powered. One application for the use of non-volatile memory in an RFID tag is to record events in the tag's environment, such as temperature, shock and vibration, to record the environment to which the object that the tag is associated with was subjected. Another such application is to record events that would indicate tampering with a container or packaging to which the tag is attached. For example, when sealed cargo containers, such as intermodal freight containers, are carrying finished goods or materials that need to be carefully tracked or inventoried, there is a need to record events indicating whether the container has been tampered with. In the past, such containers have been outfitted with RFID tags for tracking in and out of ports and shipping yards, but there was no connection between container seals and the RFID tag. Electronic tamper seals are known, but they have not been implemented with RFID tags so as to make evidence of tampering readily accessible by the same equipment that tracks the container.

Therefore a need exists for a vehicle RFID tag that can record events such as seal tampering while unpowered by a battery or reader signal.

SUMMARY OF THE INVENTION

An RFID tag having a non-volatile memory and a piezoelectric sensor is disclosed. The piezoelectric sensor produces an electrical charge that momentarily supplies electrical power to the RFID tag when subjected to a mechanical force and the electrical power is sufficient to record data in the non-volatile memory. The piezoelectric sensor is affixed to an article such that an attempt to tamper with the article produces sufficient mechanical force on the piezoelectric sensor to record data evidencing the tampering in the non-volatile memory.

In a further embodiment, the piezoelectric sensor is used as an input device. The user modifies the operating state of the tag by applying force to the piezoelectric sensor, thus recording data in the memory that determines the state of the tag. The tag may have a plurality of operating states. Each time force is applied to the sensor, the tag switches to a new operating state. Additional applications of force cause the tag to cycle through all of the available operating states.

In a further embodiment, the tag is powered by a rechargeable battery or other DC storage device and the piezoelectric sensor charges the storage device as well as providing a signal indicating application of mechanical force to the tag.

Other advantages and novel features of the invention will become apparent to those skilled in the art upon examination of the following detailed description of a preferred embodiment of the invention and the accompanying drawings.

DESCRIPTION OF THE DRAWINGS

FIG. 1. is a block diagram of an embodiment of an RFID tag having a piezoelectric sensor.

DESCRIPTION OF THE PREFERRED EMBODIMENT OF THE INVENTION

Referring to FIG. 1, an exemplary RFID tag 10 contains a piezoelectric sensor 20, a microcontroller 30, and an antenna 40. The microcontroller has a non-volatile memory 35, such as a Flash or EEPROM. Not shown in FIG. 1 are elements of the RFID tag well known in the art, including receiver and transmitter electronics. The tag microcontroller 30 is powered from either the piezoelectric sensor 20 or the tag antenna through signal rectifier 42.

As is known in the art, piezoelectric sensors produce an electrical charge when physically manipulated. The size of the charge is related to the amount of force applied to the sensor. The inventors have discovered that piezoelectric sensors can supply sufficient charge to power a microcontroller long enough to write data into a non-volatile memory.

The signal from the piezoelectric sensor 20 may be adapted to supply power to the microcontroller 30 through prior art power supply circuitry (not shown), including voltage multipliers, voltage regulators and the like. More than one piezoelectric sensor may be employed, such that mechanical forces from a variety of locations or angles of application will cause a signal to be produced.

In an exemplary embodiment, the RFID tag is mounted to a shipping container such that any attempt to open the container will cause the piezoelectric sensor to be disturbed. For example, a spring-loaded actuator is mounted to be release when the container is opened, the actuator hitting the sensor when this is done. This causes the sensor to produce an electrical charge sufficient to momentarily power the microcontroller 30. The microcontroller has an input port that indicates that it is being powered by the piezoelectric sensor 20 and not by the antenna 40. Recognizing that it is being powered by the piezoelectric sensor, the microcontroller writes data into the non-volatile memory indicating that an event has occurred consistent with a force having been applied to the piezoelectric sensor.

In an embodiment, multiple data locations are available in the non-volatile memory to store indication of piezo-powered events. In a further embodiment, a data location serves as a counter that is incremented each time the microcontroller is powered by the piezoelectric sensor.

In a further embodiment, the piezoelectric sensor is used not as a tamper indication sensor but as a manual input to the microcontroller. In this embodiment, the RFID tag has multiple operating states, for example a read-only state, and a read write state. A data location in the non-volatile memory indicates which state the tag operates in. Application of a force to the piezoelectric sensor by a user causes the data in the tag state location to be changed, thus changing the operating state of the tag. Because this state is written in non-volatile memory, the tag remains in this state until another force is applied to the sensor. The piezoelectric sensor can be used in this fashion for manually entering modifying small amount of data in the tag, whether to indicate tag operating state or for any other purpose.

In a further embodiment, the tag is powered by a rechargeable battery or other DC storage device and the piezoelectric sensor charges the storage device as well as providing a signal indicating application of mechanical force to the tag. In an environment where the tag is subject to repeated forces, the piezoelectric sensor keeps the DC storage device charged and also served to indicate to the microcontroller the occurrence of these forces.

In an embodiment, the RFID tag includes an analog to digital converter, that measures the amount of electrical charge produced by the piezoelectric sensor. The microcontroller then stores data related to this measurement in the non-volatile memory, giving an indication of the amount of force applied to the tag. For example, this embodiment could be used to record if an article was dropped and if dropped, from what height. In the case of a container seal, a recordation of the amount of force applied to the sensor could indicate whether a purposeful attempt at break-in was made, or some accidental source of mechanical force was applied.

In a further embodiment, the piezoelectric sensor is connected to the tag by wires, but is otherwise remote from the tag. One such embodiment includes installations where the piezoelectric element is permanently built into a container or article and the RFID tag is connected to and removable from the container or article.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

We claim:

1. An RFID tag comprising a non-volatile memory; and a piezoelectric sensor;

wherein said piezoelectric sensor produces an electrical charge that momentarily supplies electrical power to the RFID tag when subjected to a mechanical force and said electrical power is sufficient to record data in said non-volatile memory;

said tag further comprises a microprocessor and said piezoelectric sensor momentarily supplies power to said microprocessor and said non-volatile memory and said microprocessor records data in said non-volatile memory to indicate that the microprocessor was powered by the piezoelectric sensor.

2. The RFID tag of claim 1, wherein said piezoelectric sensor is physically attached to a container seal such that an attempt to unseal said container produces a mechanical force sufficient to produce said electrical charge.

3. The RFID tag of claim 1, wherein the RFID tag is powered only by said piezoelectric sensor and an antenna.

4. The RFID tag of claim 1, wherein said piezoelectric sensor is physically attached to an article such that an attempt to tamper with said article produces a mechanical force sufficient to produce said electrical charge.

5. The RFID tag of claim 1, further comprising an analog to digital converter and wherein said analog to digital converter is adapted to measure the size of said electrical charge and said size of electrical charge is stored in said non-volatile memory.

6. The RFID tag of claim 1, wherein said tag is a multi-protocol RFID tag.

7. The RFID tag of claim 1, wherein said tag is has a mutual authentication protocol wherein the tag authenticates a reader and said reader authenticates the tag.

8. The RFID tag of claim 1, wherein multiple events wherein the tag is powered by the piezoelectric sensor are recorded in said non-volatile memory.

9. The RFID tag of claim 1, wherein data is manually entered into said piezoelectric sensor by a user purposely applying said mechanical force to said tag.

10. The RFID tag of claim 1, wherein said tag has a plurality of operating states, said non-volatile memory contains data indicating a present state and said user changes said current state by applying said force.

11. An RFID tag comprising
    a non-volatile memory;
    a DC storage device and
    a piezoelectric sensor;
    wherein said piezoelectric sensor produces an electrical charge that charges said DC storage device when subjected to a mechanical force, said DC storage device powers the RFID tag and said charge produced by said piezoelectric sensor initiates writing of data into said nonvolatile memory to indicate that the tag was powered by the piezoelectric sensor.

12. The RFID tag of claim 11, wherein said DC storage device is Selected from the group consisting of: a battery and a capacitor.

* * * * *